(12) United States Patent
Horie et al.

(10) Patent No.: US 12,675,264 B2
(45) Date of Patent: Jul. 7, 2026

(54) INSERTING A MEMORY FENCE IN A PROGRAM IN RESPONSE TO A DETERMINATION THAT PREDETERMINED PATTERN(S) DO NOT EXIST IN THE PROGRAM

(71) Applicant: International Business Machines Corporation, Armonk, NY (US)

(72) Inventors: Michihiro Horie, Ageo City (JP); Kazunori Ogata, Soka (JP)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 17/832,329

(22) Filed: Jun. 3, 2022

(65) Prior Publication Data
US 2023/0393821 A1     Dec. 7, 2023

(51) Int. Cl.
*G06F 8/40* (2018.01)
*G06F 3/06* (2006.01)
*G06F 8/41* (2018.01)

(52) U.S. Cl.
CPC .............. *G06F 8/41* (2013.01); *G06F 3/0604* (2013.01); *G06F 3/0655* (2013.01); *G06F 3/0673* (2013.01)

(58) Field of Classification Search
CPC ...................................................... G06F 8/40
See application file for complete search history.

(56) References Cited

U.S. PATENT DOCUMENTS

| | | | |
|---|---|---|---|
| 6,292,939 B1 * | 9/2001 | Itou ......................... | G06F 8/458 |
| | | | 712/E9.032 |
| 2009/0327372 A1 * | 12/2009 | Ylonen ............... | G06F 12/0253 |
| 2016/0011982 A1 | 1/2016 | Sandoz et al. | |
| 2020/0026581 A1 | 1/2020 | Ogata et al. | |
| 2021/0089282 A1 | 3/2021 | Morgan et al. | |
| 2023/0185547 A1 * | 6/2023 | Katranov ................. | G06F 8/52 |
| | | | 717/136 |

OTHER PUBLICATIONS

Lin et al., "Fence Scoping," Proceedings of the IEEE International Conference for High Performance Computing, Networking, Storage and Analysis, 2014, 13 pages.
GraalVM, "Why Graalvm," GraalVM, 2022, 3 pages, retrieved from https://www.graalvm.org/why-graalvm/.
(Continued)

*Primary Examiner* — Jae U Jeon
(74) *Attorney, Agent, or Firm* — Michael A. Petrocelli

(57) ABSTRACT
A computer-implemented method according to one embodiment includes determining whether a predetermined write pattern and a predetermined read pattern exist in a program of an application. In response to a determination that the predetermined write pattern and the predetermined read pattern do not exist in the program, a memory fence is inserted before a variable in the program. A computer-implemented method according to another embodiment includes determining whether a predetermined write pattern exists in a program of an application. In response to a determination that the predetermined write pattern does not exist in the program, a memory fence is inserted after a variable in the program.

20 Claims, 8 Drawing Sheets

(56) References Cited

OTHER PUBLICATIONS

Maranget, et al., "A Tutorial Introduction to the ARM and POWER Relaxed Memory Models", Oct. 10, 2012, 50 Pages.
No Author, "Grallvm", JDK, Jun. 1, 2022, 5 Pages.
No Author, "Memory_Order", Concurrency Support Library, Jun. 1, 2022, 10 Pages.
No Author, "QBICC", JAVA, Jun. 1, 2022, 3 Pages.
No Author, "Supersonic/Subatomic/Java", Quarkus, May 28, 2022, 6 Pages.

* cited by examiner

300

400

420

440

INSERTING A MEMORY FENCE IN A PROGRAM IN RESPONSE TO A DETERMINATION THAT PREDETERMINED PATTERN(S) DO NOT EXIST IN THE PROGRAM

BACKGROUND

The present invention relates to program compilers, and more specifically, this invention relates to inserting a memory fence before a variable in a program in response to a determination that predetermined pattern(s) do not exist in the program.

Statically compiling programs, e.g., such as JAVA programs, has recently become a popular approach for micro services or serverless applications. Native image is used to run each service implemented in some programs. Some program frameworks create and run native images by using a framework for creating language-agnostic tools like debuggers, profilers, or other instrumentations which may be provided as a static compiler to generate native images. Furthermore, some program frameworks are restricted to use dynamic class loading and reflections. Unlike a Just-In-Time (JIT) compiler, static compilation can be relatively more time consuming due to static compilation occurring before running services.

SUMMARY

A computer-implemented method according to one embodiment includes determining whether a predetermined write pattern and a predetermined read pattern exist in a program of an application. In response to a determination that the predetermined write pattern and the predetermined read pattern do not exist in the program, a memory fence is inserted before a variable in the program.

A computer-implemented method according to another embodiment includes determining whether a predetermined write pattern exists in a program of an application. In response to a determination that the predetermined write pattern does not exist in the program, a memory fence is inserted after a variable in the program.

A computer program product according to another embodiment includes a computer readable storage medium having program instructions embodied therewith. The program instructions are readable and/or executable by a computer to cause the computer to determine, by the computer, whether a predetermined write pattern and a predetermined read pattern exist in a program of an application. In response to a determination that the predetermined write pattern and the predetermined read pattern do not exist in the program, a memory fence is inserted, by the computer, before a variable in the program.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for inserting a memory fence before a variable in a program in response to a determination that predetermined pattern(s) do not exist in the program.

In one general embodiment, a computer-implemented method includes determining whether a predetermined write pattern and a predetermined read pattern exist in a program of an application. In response to a determination that the predetermined write pattern and the predetermined read pattern do not exist in the program, a memory fence is inserted before a variable in the program.

In another general embodiment, a computer-implemented method includes determining whether a predetermined write pattern exists in a program of an application. In response to a determination that the predetermined write pattern does not exist in the program, a memory fence is inserted after a variable in the program.

In another general embodiment, a computer program product includes a computer readable storage medium having program instructions embodied therewith. The program instructions are readable and/or executable by a computer to cause the computer to determine, by the computer, whether a predetermined write pattern and a predetermined read pattern exist in a program of an application. In response to a determination that the predetermined write pattern and the predetermined read pattern do not exist in the program, a memory fence is inserted, by the computer, before a variable in the program.

Figure 1:
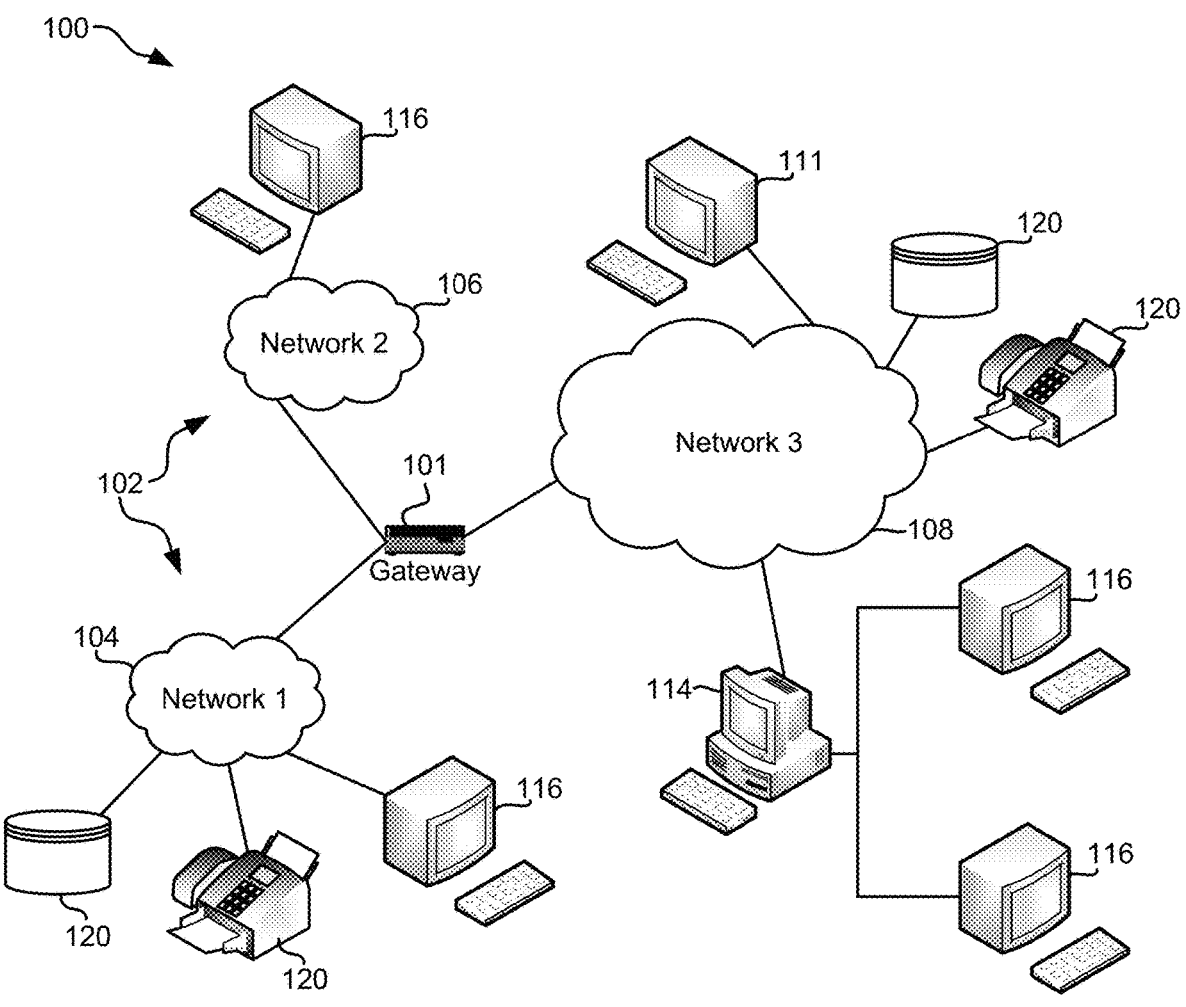
FIG. 1 is a diagram of a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
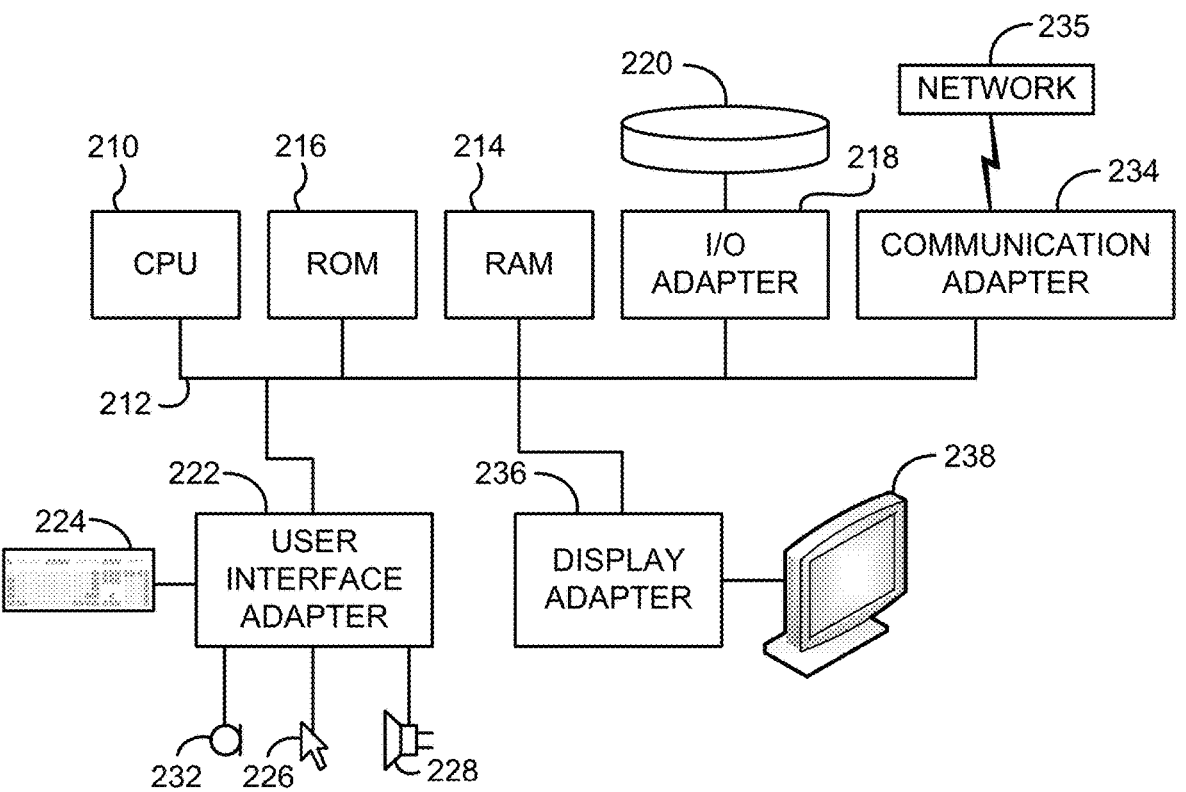
FIG. 2 is a diagram of a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

As mentioned elsewhere above, statically compiling programs, e.g., such as JAVA programs, has recently become a popular approach for micro services or serverless applications. Native image is used to run each service implemented in some programs. Some program frameworks create and run native images by using a framework for creating language-agnostic tools like debuggers, profilers, or other instrumentations which may be provided as a static compiler to generate native images. Furthermore, some program frameworks are restricted to use dynamic class loading and reflections. Unlike a Just-In-Time (JIT) compiler, static compilation can be relatively more time consuming due to static compilation occurring before running services.

In some conventional programs in which data operations, e.g., write operations, read operations, etc., are being performed on different threads, values of variables of the program are sometimes read incorrectly due to a hardware implementation associated with the data operations. For example, assume that a first thread writes the value "1" to variable "x" of a program and thereafter a second thread writes the value "1" to variable "y" of the program. Also assume that the first thread reads the value of the variable "y" subsequent to the second thread writing the value "1" to the variable "y" of the program, and that the second thread reads the value of the variable "x" subsequent to the first thread reading the value of the variable "y." Although the value of variable "y" and the value of the variable "x" should be observed logically to be "1," some conventional hardware implementations observe the value of such variables to be "0." This same issue of misreads, e.g., incorrect variable value observations, may also be present in programs executed across more than two threads, e.g., three threads, four threads, etc., on volatile variables. This is because such conventional hardware implementations may reorder instructions of the program in order to achieve performance benefits. This incorrect observation may be acceptable behavior to some programmers; however, in some compiling programs a special keyword is provided, e.g., volatile, to make the program more intuitive. For conventional programs in which one or more variables are specified as volatile, there is a guarantee that such variables have a value of "1." Ensuring that this guarantee is met adds a significant amount of compiling time within conventional programs.

In sharp contrast to the deficiencies described above, various embodiments and approaches described herein include determining whether a predetermined read pattern and/or a predetermined write pattern exist in a program of an application, and inserting a memory fence before a variable in the program based on the determination of whether the predetermined read pattern and/or the predetermined write pattern exist in the program. These various embodiments and approaches enable a significant reduction in execution time, e.g., confirmed during testing to enable at least an 81% reduction in time executing a program, compared to the conventional programs described above.

Figure 3:
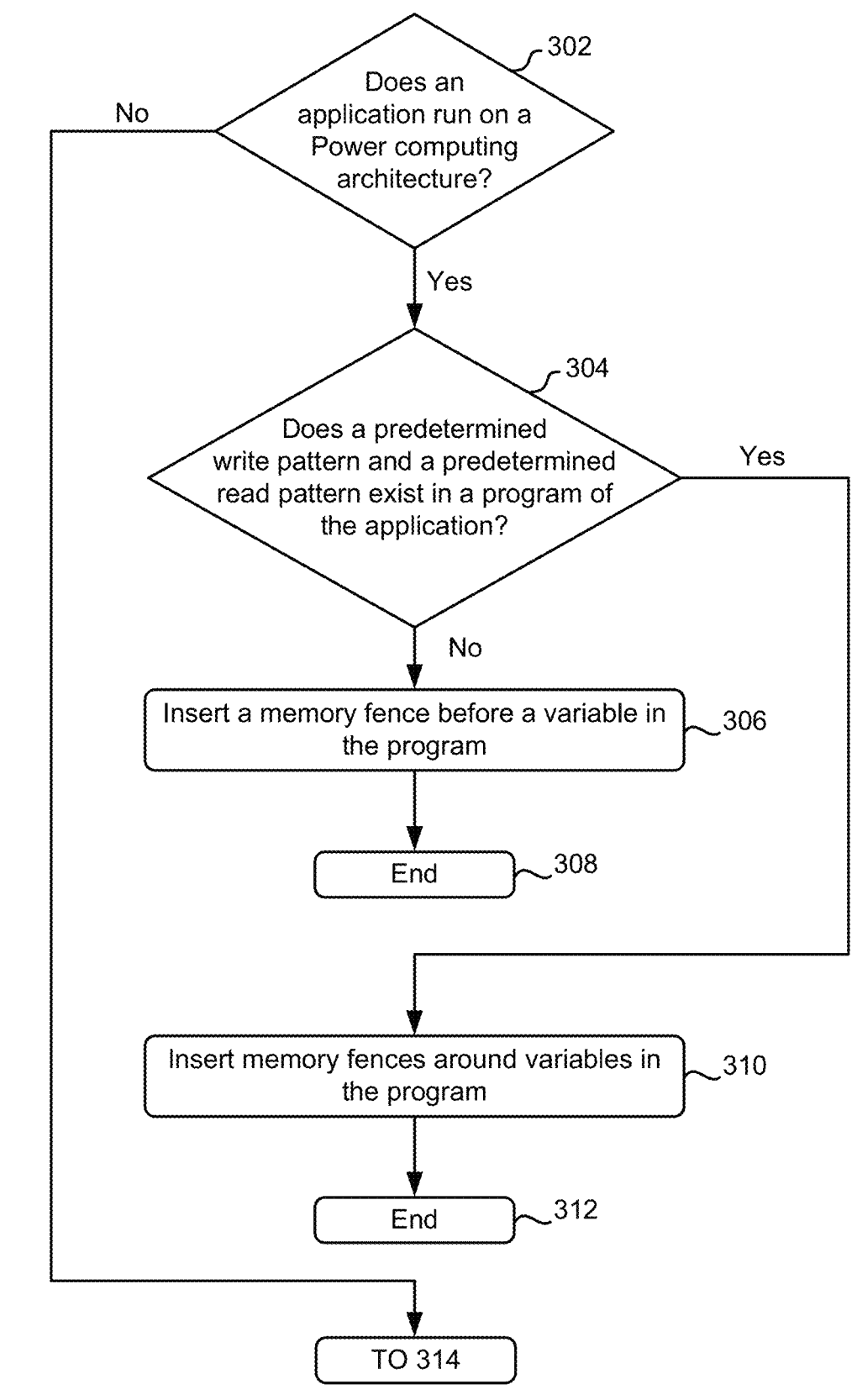
FIG. 3 is a flowchart of a method, in accordance with one embodiment.
Figure 3:
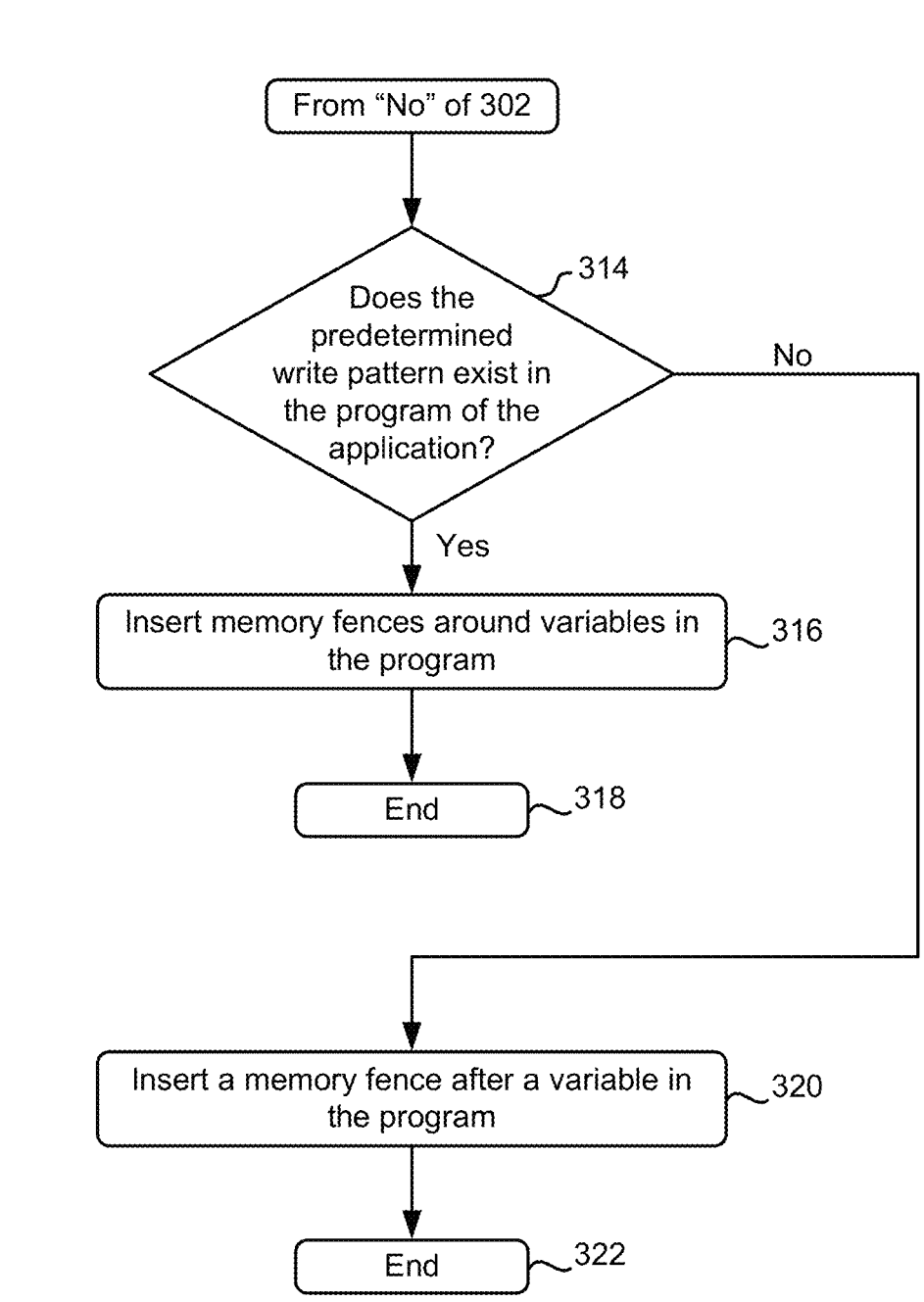

Now referring to FIG. 3, a flowchart of a method 300 is shown according to one embodiment. The method 300 may be performed in accordance with the present invention in any of the environments depicted in FIGS. 1-7, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 300 includes techniques for inserting a relatively weakest memory fence used for volatile variable accesses in statically compiling program applications, e.g., such as JAVA applications, which do not have dynamic class loading and reflections. Note that although some JAVA applications have dynamic class loading and reflections, some embodiments and approaches described herein may only targets JAVA applications that do not use dynamic class loading and reflections. In some approaches, the applications run on a hardware implementation, where hardware of the hardware implementation is instructed to operate, e.g., perform read and/or write operations, during operation of the application. These techniques include statically analyzing a whole program to detect known patterns, and based on results of this analysis, inserting memory fences around variables in predetermined locations of the program. This enables a reduction in program execution time by preventing misreads that would otherwise occur as a result of hardware implementation.

Method 300 may include determining the type of computing architecture that an application runs on. In some approaches, the type of computing architecture that the application runs on may be determined by determining one or more metrics of operation of the computing architecture, e.g., an amount of memory that processing instructions on the computing architecture consumes, an amount of heat that processing instructions on the computing architecture generates on hardware of the computing architecture, a power consumption that processing instructions on the computing architecture consumes, etc. The determined metric(s) may be compared with a table of predetermined metric values correlated to one or more computing architectures to determine the computing architecture that the application runs on. In some other approaches, the type of computing architecture that the application runs on may be additionally and/or alternatively determined by referencing configuration information and/or metadata of the computing architecture and/or of the application that details the type of computing architecture that the application runs on. In yet further approaches, the type of computing architecture that the application runs on may be additionally and/or alternatively determined using known techniques.

Decision 302 of method 300 includes determining whether the application runs on a first type of computing architecture, such as a Power computing architecture. Note that, for the present description, the first type of computing architecture will be described in terms of a Power computing architecture. This has been done by way of example only, and a different type of computing architecture may be the first type of computing architecture in other embodiments. In response to a determination that the application runs on a Power computing architecture, e.g., as illustrated by the "Yes" logical path of decision 302, a determination is made as to whether a predetermined write pattern and a predetermined read pattern exist in a program of the application, e.g., see decision 304. The predetermined write pattern may be any known type of write pattern, e.g., such any or more store operations. In a preferred approach, the predetermined write pattern is a Store-Buffering (SB) pattern. Furthermore, in such an approach, variables of the program may be volatile variables, e.g., volatile variables of a JAVA program that are specified to be volatile variables. Assuming that the write pattern is a SB pattern and variables of the program are volatile variables, in some approaches determining whether the SB pattern exist in the program of the application may include causing a first thread of execution to be performed in the program. The first thread of execution includes writing to a first volatile variable "x" and then reading at a second volatile variable "y." A second thread of execution may be caused to be performed in the program, where the second thread of execution includes writing to the second volatile variable "y" and then reading the write at the first volatile variable "x" in an order of the program. In such an approach, the write to the first volatile variable "x" is performed before the read at the first volatile variable "x" in the order of the program, and the read to the second volatile variable "y" is performed before the read at the second volatile variable "y" in the order of the program. In response to a determination that the first thread of execution includes such an ordered sequence, it may be determined that the predetermined write pattern exists in the program of the application. Similarly, the predetermined read pattern may be any known type of read pattern. In a preferred approach, the predetermined read pattern is an Independent Reads of Independent Writes (IRIW) pattern. Furthermore, in such an approach, variables of the program may be volatile variables, e.g., volatile variables of a JAVA program that are specified to be volatile variables. Assuming that the write pattern is an IRIW pattern and variables of the program are volatile variables, in some approaches determining whether the IRIW pattern exists in the program of the application may include causing a first thread of execution to be performed in the program. The first thread of execution may include writing to a first volatile variable "x" and causing a second thread of execution to be performed in the program, where the second thread of execution includes reading at the first volatile variable and then writing at a second volatile variable "y." Furthermore, a third thread of execution may be caused to be performed in the program, where the third thread of execution includes writing to the second volatile variable "y." Additionally a fourth thread of execution may be caused to be performed in the program, where the fourth thread of execution includes reading at the second volatile variable and then reading at the first volatile variable "y" in an order of the program. Note that the write to the first volatile variable "x" is performed before the read at the first volatile variable "x" in the order of the program, and the write to the second volatile variable "y" is performed before the read at the second volatile variable "y" in the order of the program. In response to a determination that the first thread of execution includes such ordered sequences, it may be determined that the predetermined read pattern exists in the program of the application.

In summary, the whole program is analyzed in a simple way on the basis of the notions that SB patterns and IRIW patterns are not frequently used in realistic programs.

Static analysis may additionally and/or alternatively be performed for determining whether the predetermined write pattern and the predetermined read pattern exist in the program of the application. In some approaches the static analysis includes checking control flows to confirm that SB patterns and IRIW patterns are not present in the program. Loops of the program are extracted only once during the checking of the control flows in some approaches. The static analysis may additionally and/or alternatively include checking data flows to confirm volatile variables accesses, e.g., read or write, and program orders associated therewith in some approaches. An entirety of the program may additionally and/or alternatively be performed in an inter-procedural manner, and a default compilation time may be determined, e.g., one minute, five minutes, ten minutes, one hour, etc. According to various approaches, determination of the default compilation time may include, e.g., identifying an amount of time that at least a predetermined amount of processing resources are available for using during the static analysis, based on input received from an administrator device, etc. The default compilation time may define a duration that the program is to be performed. For example, the analysis of the entirety of the program may be stopped in response to passage of the default compilation time, e.g., the time expires, the time is exceeded, the threshold time is met, etc., wherein the default compilation time is modifiable at compilation time.

It should be noted that the determination of whether the predetermined write pattern and the predetermined read pattern exist in the program of the application is preferably performed along a program order of the program, e.g., as opposed to precisely checking each thread's behavior. In other words, at least two threads are in some approaches observed to determine whether the predetermined write pattern and/or the predetermined read pattern exist in the program of the application because incorrect variable observations may occur as a result of an observation that incorporates at least two threads. A determination is made as to whether the predetermined write pattern and the predetermined read pattern exist in the program of the application because such patterns, when executed over a plurality of threads, may result in conventional systems incorrectly observing values of volatile variables based on hardware implementations in such conventional systems. Furthermore, execution time of the program may vary depending on the type of memory fences that are included around variables of the program. In order to prevent such incorrect observations and in order to reduce execution time of the program, operation 306 includes inserting a memory fence before a variable in the program in response to a determination that the predetermined write pattern and the predetermined read pattern do not exist in the program, e.g., as illustrated by the "No" logical path of decision 304. Note that although memory fences are described herein to be inserted with respect to variables of the program, the memory fences may additionally and/or alternatively be inserted with respect to operations associated with those variables, e.g., volatile variable "x" and R(x)=1, "x" and R(x), "y" and R(y)=1, "y" and R(y)=1, "x" and W(x)=1, "x" and W(x), "y" and W(y)=1, "y" and W(y)=1, etc. In some preferred approaches, an acquire fence is inserted before a volatile read in the program in response to the determination that the predetermined write pattern and the predetermined read pattern do not exist in the program, e.g., see operation 306. The acquire fence is in some preferred approaches inserted before each read of volatile variables instead of, and thereby not, inserting a sequentially consistent fence before the read of volatile variables. Operation 308 includes optionally ending the method subsequent to the acquire fence being inserted before a volatile read in the program.

Inserting the acquire fence before each read of volatile variables of the program instead of, and thereby not, inserting a sequentially consistent fence before the read of volatile variables in response to the determination that the predetermined write pattern and the predetermined read pattern do not exist in the program improves performance of computer systems that execute the program. This is because program execution time is reduced by implementing relatively "weaker" memory fences in the program where such insertion does not jeopardize performance of execution of the program, e.g., observational accuracy of variables of the program. For more specific context, the acquire fence may be deemed to be a relatively "weaker" memory fence than a sequentially consistent fence which may be otherwise inserted in the program. This is because relatively "weaker" memory fences such as acquire fences and/or release fences include relatively fewer variable guarantees than the variable guarantees that a sequentially consistent fence includes. As will be demonstrated in greater detail elsewhere herein, e.g., see FIG. 7, this reduction in program execution time results in significant improvements to functioning of computer systems associated with the program of the application.

Although operation 308 includes ending the method subsequent to the memory fence being inserted before a variable in the program, in some approaches method 300 optionally includes performing additional testing subsequent to the insertion of the memory fence in the program. For example, the additional testing may include performing known types of troubleshooting and/or read analysis to ensure that the memory fence successfully improves execution time of the program. Such testing may additionally and/or alternatively include verifying a reduction in program execution time, e.g., comparing a program execution time before the insertion of the memory fence with a program execution time subsequent to the insertion of the memory fence.

Referring again to decision 304 of method 300, in response to a determination that the predetermined write pattern and/or the predetermined read pattern exist in the program, e.g., as illustrated by the "Yes" logical path extending from decision 304, method 300 continues to operation 310. Operation 310 includes inserting memory fences around variables in the program in response to a determination that the predetermined write pattern and/or the predetermined read pattern exist in the program. It should be noted that the term "around" infers that the predetermined memory fences are inserted at one or more predetermined locations with respect to the variables in the program. For example, one approach for inserting the memory fences around variables in the program in response to the determination that the predetermined write pattern and/or the predetermined read pattern exist in the program includes inserting a release fence before a volatile write in the program and inserting a release fence after the volatile write in the program. Note that in some approaches, it is not sufficient to insert a release fence after a volatile write and an acquire fence before a volatile read. Furthermore, the release fence is inserted before the volatile write because the release fence prevents a CPU's reordering in the current thread and instructions, declared before the release fence, are reordered to be positioned after the release fence. Without the release fence before the volatile write in the current thread, another load can be reordered after the store by CPU. For further context, the release fence after a variable, e.g., such as a variable associated with the volatile write, guarantees that the variable is visible for other threads that execute acquire fences if the release fence is issued before the acquire fences issue. Also, no reads or writes in the current thread can be reordered after the volatile write. Inserting the memory fences around variables in the program in response to the determination that the predetermined write pattern and/or the predetermined read pattern exist in the program may additionally and/or alternatively include inserting a sequentially consistent fence before a volatile read in the program and inserting an acquire fence after the volatile read in the program. Note that the sequentially consistent fence inserted before the volatile read is used to support the SB pattern. Furthermore, the acquire fence is inserted after the volatile read because the acquire fence prevents the CPU's reordering in the current thread and instructions declared after the acquire fence are reordered toward before the acquire fence. Without the acquire fence being inserted before the volatile read in the current thread, another store can be reordered before the volatile read, e.g., load, by the CPU. In some approaches, an acquire fence inserted before a variable, e.g., such as the variable associated with the variable read, guarantees that the variable is visible when the variable is written with a release fence by another thread and the release occurs before the acquire. Also, no reads or writes in the current thread can be reordered before this load. Furthermore, a sequentially consistent fence guarantees the total order in which all threads observe all modifications in the same order. In yet some additional approaches, a sequentially consistent fence may be inserted before a volatile read in the program provided that the volatile read follows a volatile write in the program along the same thread.

In operation 312, the method optionally ends, although in some approaches additional testing may be performed to ensure that inserting the memory fence before the variable in the program results in a reduction of execution time.

Referring again to decision 302 of method 300, in some approaches a determination is made that the application does not run on a Power computing architecture, e.g., as illustrated by the "No" logical path of decision 302. For example, it may be determined that the application instead runs on a computing architecture, e.g., such as x86, Advanced RISC Machines (ARM), Open Java Development Kit (OpenJDK) for x86 and ARM, etc. In response to a determination that the application runs on a computing architecture other than the Power computing architecture, the method continues to decision 314.

Decision 314 includes determining whether a predetermined write pattern exists in a program of the application. As indicated above, in some approaches the determination of whether the predetermined write pattern exists in the program of the application is performed in response to the determination that the application runs on a computing architecture other than a Power computing architecture. The predetermined write pattern may be any known type of write pattern, e.g., such any one or more store operations. In a preferred approach, the predetermined write pattern is a SB pattern. Furthermore, in such an approach, variables of the program may be volatile variables, e.g., volatile variables of a JAVA program that are specified to be volatile variables. Assuming that the write pattern is a SB pattern and variables of the program are volatile variables, in some approaches determining whether the SB pattern exist in the program of the application may include causing a first thread of execution to be performed in the program. The first thread of execution includes writing to a first volatile variable "x" and then reading at a second volatile variable "y." A second thread of execution may be caused to be performed in the program, where the second thread of execution includes writing to the second volatile variable "y" and then reading the write at the first volatile variable "x" in an order of the program. In such an approach, the write to the first volatile variable "x" is performed before the read at the first volatile variable "x" in the order of the program, and the read to the second volatile variable "y" is performed before the read at the second volatile variable "y" in the order of the program. In response to a determination that the first thread of execution includes such a write sequence, it may be determined that the predetermined write pattern exists in the program of the application.

In response to a determination that the predetermined write pattern exists in the program, e.g., as illustrated by the "Yes" logical path of decision 314, memory fences are inserted around variables in the program, e.g., see operation 316. In some approaches, inserting the memory fences around variables in the program includes inserting a release fence before a volatile write in the program and inserting a sequentially consistent fence after the volatile write in the program. Inserting the memory fences around variables in the program may additionally and/or alternatively include inserting an acquire fence before a volatile read in the program, and inserting an acquire fence after the volatile read in the program. In yet some additional approaches, a sequentially consistent fence may be inserted before a volatile read in the program provided that the volatile read follows a volatile read of a variable in the program along the same thread. In such an approach the volatile reads may be for different volatile variables. Note that, in some approaches, it is not sufficient to insert a release fence after a volatile write and an acquire fence before a volatile read because of the potential for reordering issues similar to those described elsewhere herein, e.g., see operation 310. Furthermore, compared to approaches in which the computing architecture is determined to run on Power, here a sequentially consistent fence may be inserted at the store side of a volatile variable, not the load side.

Although operation 318 includes ending the method subsequent to memory fences being inserted around variables in the program, in some approaches method 300 optionally includes performing additional testing subsequent to the insertion of memory fences around the variables in the program. For example, the additional testing may include performing known types of troubleshooting and/or read analysis to ensure that the memory fences successfully prevent misreads of variables of the program.

In contrast, in response to a determination that the predetermined write pattern does not exist in the program, e.g., as illustrated by the "No" logical path of decision 314, a memory fence is inserted before a variable in the program. Operation 320 includes inserting the memory fence after a variable in the program. According to a more specific approach, inserting the memory fence after a variable in the program may include inserting a release fence after a volatile write in the program (preferably each volatile write of the program) instead of, and thereby not, inserting a sequentially consistent fence. Operation 322 includes optionally ending the method subsequent to performing operation 320.

Inserting the acquire fence before each read of volatile variables of the program instead of, and thereby not, inserting a sequentially consistent fence before the read of volatile variables in response to the determination that the predetermined write pattern does not exist in the program improves performance of computer systems that execute the program. This is because program execution time is reduced by implementing relatively "weaker" memory fences in the program where such insertion does not jeopardize performance of execution of the program, e.g., observational accuracy of variables of the program. For more specific context, the acquire fence may be deemed to be a relatively "weaker" memory fence than a sequentially consistent fence which may be otherwise inserted in the program. This is because relatively "weaker" memory fences such as acquire fences and/or release fences include relatively fewer variable guarantees than the variable guarantees that a sequentially consistent fence includes. It should be noted that the techniques for inserting memory fences as described in various embodiments and approaches described herein has heretofore not been considered for reducing program execution time. In sharp contrast, existing JIT compilers have not and would not consider inserting memory fences depending on whether SB and IRIW patterns are identified in a program because identifying such patterns would consume an unacceptable amount of time at runtime. Accordingly, the inventive discoveries disclosed herein with regards to inserting memory fences in a program proceed contrary to conventional wisdom.

Figure 4A:
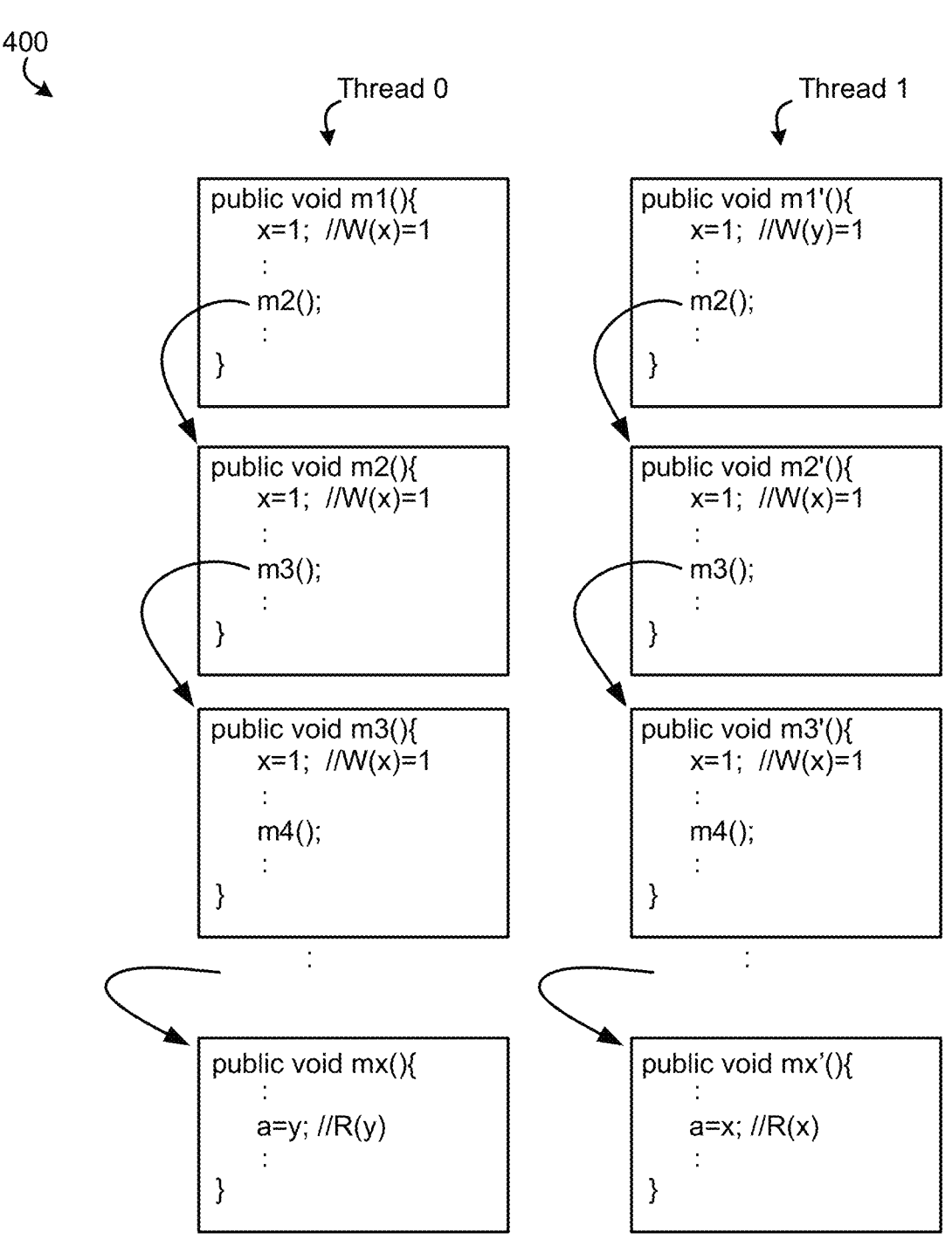
FIG. 4A is a first stage of a process, in accordance with one embodiment.
Figure 4B:
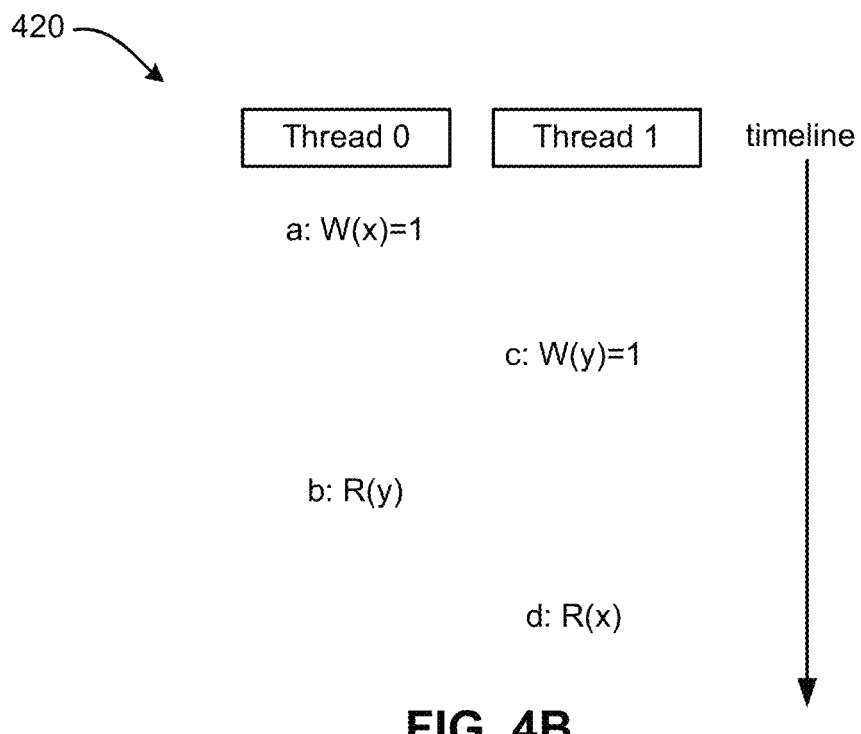
FIG. 4B is a second stage of the process of FIG. 4A.
Figure 4C:
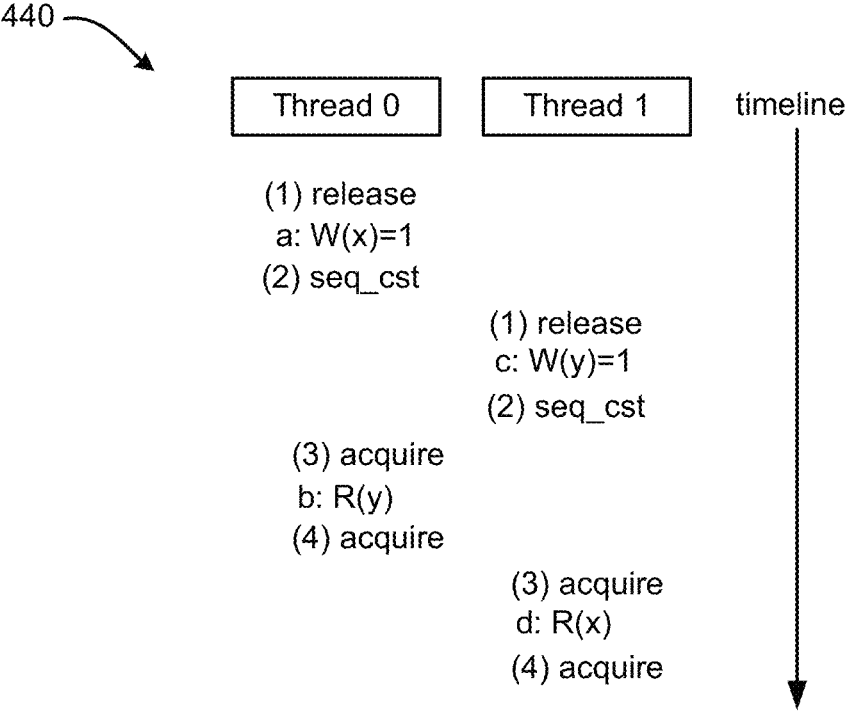
FIG. 4C is a third stage of the process of FIGS. 4A-4B.

FIGS. 4A-4C depict stages 400, 420, 440 of a process in which a predetermined pattern is identified in two threads of a program and memory fences are inserted around variables in the program, in accordance with one embodiment. As an option, the present stages 400, 420, 440 may be implemented in conjunction with features from any other embodiment listed herein, such as those described with reference to the other FIGS. Of course, however, such stages 400, 420, 440 and others presented herein may be used in various applications and/or in permutations which may or may not be specifically described in the illustrative embodiments listed herein. Further, the stages 400, 420, 440 presented herein may be used in any desired environment.

Referring first to FIG. 4A, a first stage includes a first thread Thread 0 of a program and a second thread Thread 1 of a program.

Referring next to a second stage 420 in FIG. 4B, various operations of the first thread Thread 0 and a second thread Thread 1 of the first stage 400 of FIG. 4A are highlighted along a temporal timeline, e.g., see timeline. For example, operation a includes a write operation in which volatile variable x is set to the value of 1, e.g., see W(x)=1. Next along the timeline, write operation c occurs in which volatile variable y is set to the value of 1, e.g., see W(y)=1. Thereafter, read operation b occurs in which volatile variable y is read, e.g., see R(y). Thereafter, read operation d occurs in which volatile variable x is read, e.g., see R(x). Together, the operations a-d illustrate a SB pattern that is determined to exist as a predetermined write pattern in the program.

Referring now to a third stage 440 in FIG. 4C, in response to a determination that the predetermined write pattern, e.g., SB pattern, exists in the program, predetermined memory fences are inserted around variables in predetermined locations of the program of the threads. For example, a release fence, e.g., see (1) release, is inserted before each volatile write in the program and a sequentially consistent fence, e.g., see (2) seq_cst, is inserted after each volatile write in the program. Furthermore, an acquire fence, e.g., see (3) acquire, is inserted before each volatile read in the program, and an acquire fence, e.g., see (4) acquire, is inserted after each volatile read in the program. Note that in response to a determination that the program runs on a computing architecture other than Power, and in response to a determination that the predetermined write pattern does not exist in the program, a release fence would otherwise be inserted after each volatile write in the program instead of inserting a sequentially consistent fence.

Figure 5A:
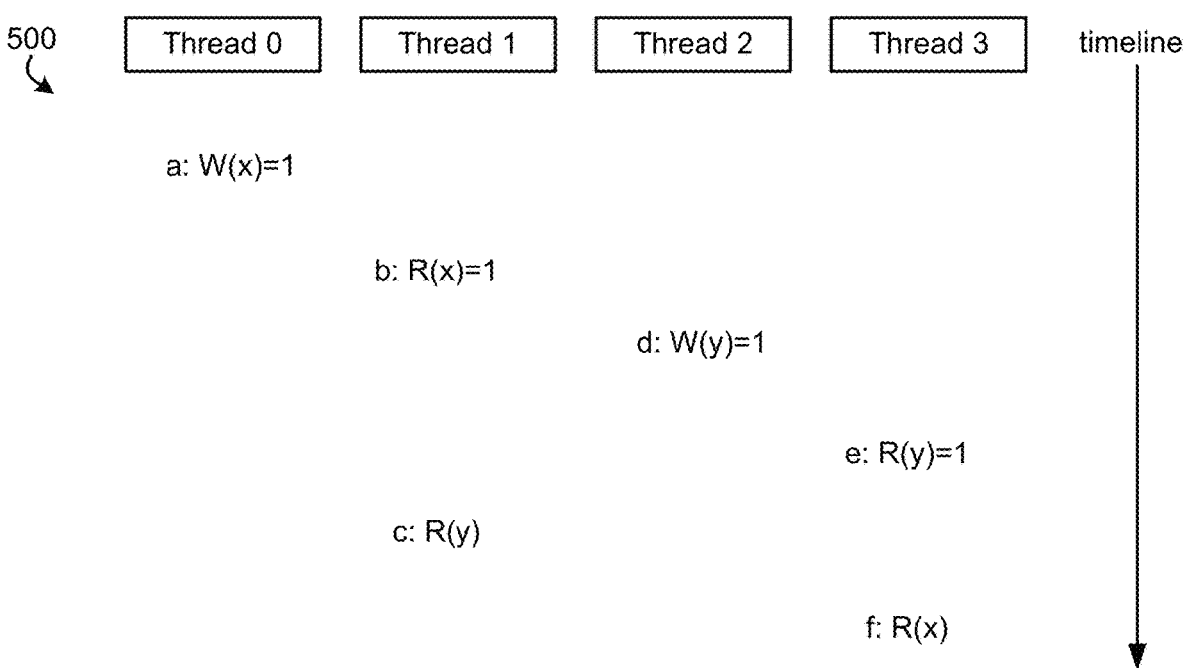
FIG. 5A is a first stage of a process, in accordance with one embodiment.
Figure 5B:
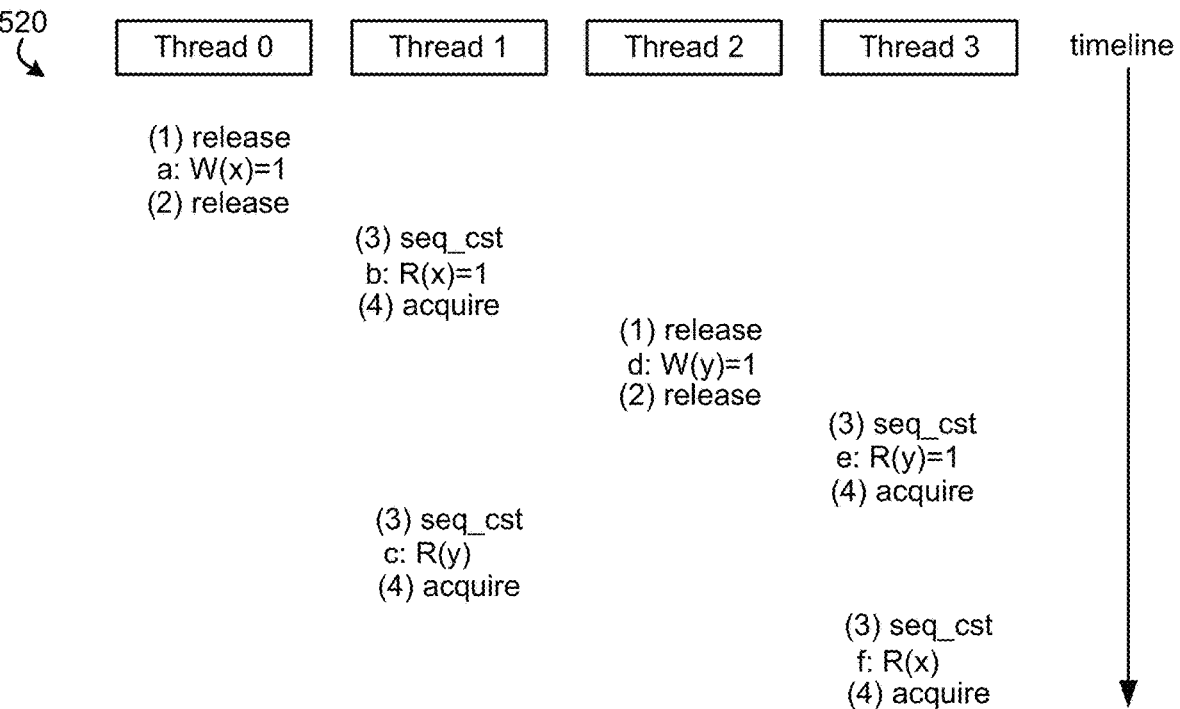
FIG. 5B is a second stage of the process of FIG. 5A.

FIGS. 5A-5B depict stages 500, 520 of a predetermined pattern being identified in a plurality of threads of a program and memory fences being inserted around variables in the program, in accordance with one embodiment. As an option, the present stages 500, 520 may be implemented in conjunction with features from any other embodiment listed herein, such as those described with reference to the other FIGS. Of course, however, such stages 500, 520 and others presented herein may be used in various applications and/or in permutations which may or may not be specifically described in the illustrative embodiments listed herein. Further, the stages 500, 520 presented herein may be used in any desired environment.

Referring first to FIG. 5A, a first stage includes a first thread Thread 0 of a program executes a write operation a in which volatile variable x is set to the value of 1, e.g., see W(x)=1. Thereafter, a second thread Thread 1 of the program executes a read operation b in which volatile variable x is read to be the value 1, e.g., see R(x)=1. Thereafter, a third thread Thread 2 of the program executes a write operation d in which volatile variable y is set to the value of 1, e.g., see W(y)=1. Thereafter, a fourth thread Thread 3 of the program executes a read operation e in which volatile variable y is read to be the value 1, e.g., see R(y)=1. Thereafter, the second thread Thread 1 of the program executes a read operation c on volatile variable y, e.g., see R(y). Thereafter, the fourth thread Thread 3 of the program executes a read operation f on volatile variable x, e.g., see R(x). Together, the operations a-f illustrate an IRIW pattern that is determined to exist as a predetermined read pattern in the program. Assume for purposes of an example that the program also contains a SB pattern that is determined to exist as a predetermined write pattern in the program.

Referring now to a second stage 520 of FIG. 5B, in response to a determination that the predetermined write pattern, e.g., SB pattern, and the predetermined read pattern, e.g., IRIW pattern, exist in the program, memory fences are positioned around variables in predetermined locations of the program. For example, a release fence, e.g., see (1) release, is inserted before each volatile write in the program, and a release fence, e.g., see (2) release, is inserted after each volatile write in the program. Furthermore, a sequentially consistent fence, e.g., see (3) seq_cst, before each volatile read in the program, and an acquire fence, e.g., see (4) acquire, is inserted after each volatile read in the program. Note that in response to a determination that the program runs on a Power computing architecture, and in response to a determination that the predetermined read pattern and the predetermined write pattern do not exist in the program, an acquire fence would otherwise be inserted before each volatile read in the program instead of a sequentially consistent fence.

Figure 6:
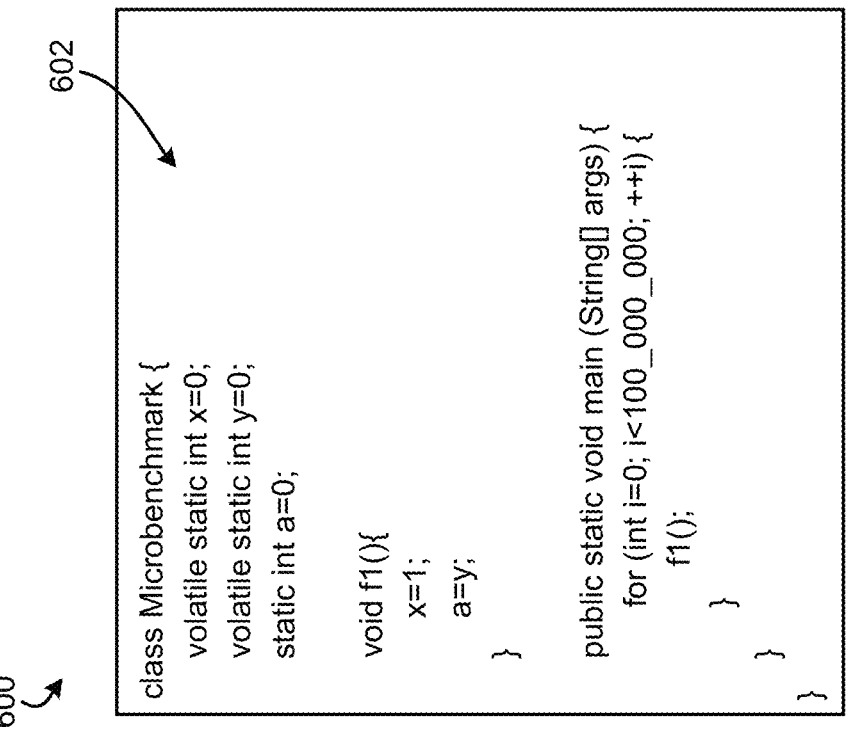
FIG. 6 is a sample of pseudocode, in accordance with one embodiment.

FIG. 6 depicts a sample of pseudocode 600, in accordance with one embodiment. As an option, the present sample of pseudocode 600 may be implemented in conjunction with features from any other embodiment listed herein, such as those described with reference to the other FIGS. Of course, however, such sample of pseudocode 600 and others presented herein may be used in various applications and/or in permutations which may or may not be specifically described in the illustrative embodiments listed herein. Further, the sample of pseudocode 600 presented herein may be used in any desired environment.

With continued reference to FIG. 6, the sample of pseudocode 600 includes segments 602 for determining whether a predetermined write pattern and a predetermined read pattern exist in a program of an application. In response to a determination that the predetermined write pattern and the predetermined read pattern exist in the program, memory fences are preferably inserted around variables in predetermined locations of the program. In contrast, in response to a determination that the predetermined write pattern and the predetermined read pattern do not exist in the program, an acquire fence is preferably inserted before each volatile read in the program instead of inserting a sequentially consistent fence.

The segments 602 in some approaches use a micro benchmark to repeat writes and reads of volatile variables. This approach may be embedded into QBICC in some approaches and is able to generate a native image for this benchmark.

Figure 7:
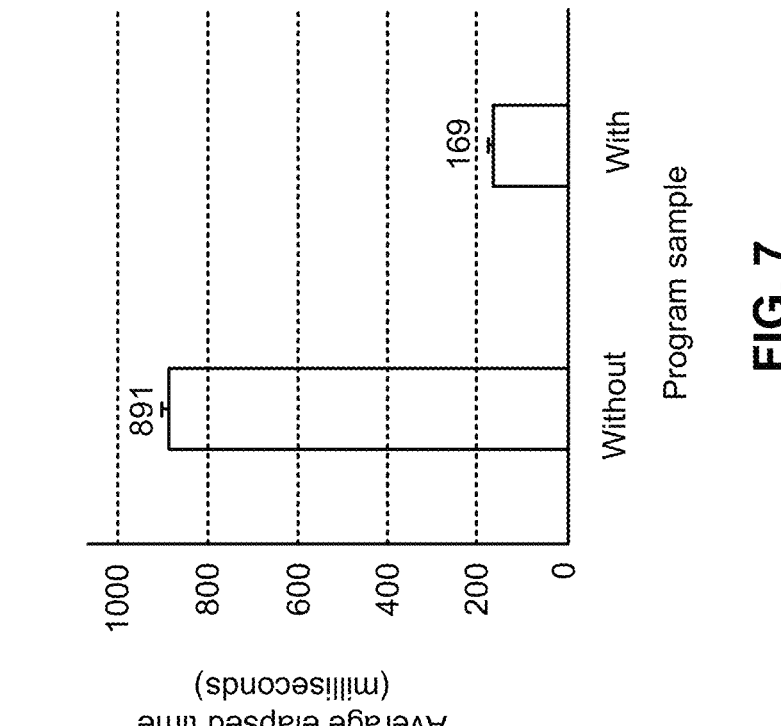
FIG. 7 is a chart, in accordance with one embodiment.

FIG. 7 depicts a chart 700, in accordance with one embodiment. As an option, the present chart 700 may be implemented in conjunction with features from any other embodiment listed herein, such as those described with reference to the other FIGS. Of course, however, such chart 700 and others presented herein may be used in various applications and/or in permutations which may or may not be specifically described in the illustrative embodiments listed herein. Further, the chart 700 presented herein may be used in any desired environment.

The chart 700 includes a y-axis, e.g., see Average elapsed time (milliseconds), that illustrates an average elapsed time for executing a program of an application. The chart 700 further includes an x-axis, e.g., see Program sample, which includes a sample of a first program, e.g., see Without, whereby a memory fence is inserted before a variable of the first program in response to a determination that predetermined patterns, e.g., SB patterns, IRIW patterns, etc., do not exist in the first program. In contrast, the x-axis, e.g., see Program sample, includes a sample of a second program, e.g., see With, whereby a memory fence is inserted before a variable of the second program in response to a determination that predetermined patterns, e.g., SB patterns, IRIW patterns, etc., do not exist in the second program. By using the techniques described herein to insert a memory fence such as an acquire fence before a volatile read in the second program in response to the determination that the predetermined pattern(s) do not exist in the second program, execution time is significantly reduced, e.g., the reduction in execution time was confirmed during testing to enable at least a 81% reduction, when compared to executing a program without doing so, e.g., see With vs. Without.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

determining whether a predetermined write pattern and a predetermined read pattern exist in a program of an application run on a hardware implementation;

in response to a determination that the predetermined write pattern and the predetermined read pattern do not exist in the program, inserting a memory fence before a variable in the program, wherein the insertion is performed by hardware of the hardware implementation; and subsequent to the insertion of the memory fence, issuing instructions to cause the hardware of the hardware implementation to execute the program, wherein an execution time of the program subsequent to the insertion of the memory fence before the variable in the program is relatively less than an execution time of the program before the insertion of the memory fence before the variable in the program, wherein the hardware of the hardware implementation is a processor, wherein the determining whether the predetermined write pattern and the predetermined read pattern exist in the program of the application comprises issuing instructions to cause the hardware to perform at least one thread of execution in the program.

2. The computer-implemented method of claim 1, wherein the determination of whether the predetermined write pattern and the predetermined read pattern exist in the program of the application is performed in response to a determination that the application runs on a Power computing architecture.

3. The computer-implemented method of claim 2, wherein the variable of the program is a volatile variable, and comprising:

verifying a reduction in program execution time, wherein the verifying includes comparing the execution time of the program subsequent to the insertion of the memory fence before the variable in the program with the execution time of the program before the insertion of the memory fence before the variable in the program.

4. The computer-implemented method of claim 3, wherein the predetermined write pattern is a Store-Buffering (SB) pattern.

5. The computer-implemented method of claim 4, wherein the predetermined read pattern is an Independent Reads of Independent Writes (IRIW) pattern.

6. The computer-implemented method of claim 3, wherein inserting the memory fence before the variable in the program includes: inserting an acquire fence before a volatile read in the program.

7. The computer-implemented method of claim 3, comprising: in response to a determination that the predetermined write pattern and the predetermined read pattern exist in the program, inserting memory fences around variables in the program, wherein inserting memory fences around variables in the program includes: inserting a release fence before a volatile write in the program, inserting a release fence after the volatile write in the program, inserting a sequentially consistent fence before a volatile read in the program, and inserting an acquire fence after the volatile read in the program.

8. The computer-implemented method of claim 1, wherein the determination of whether the predetermined write pattern and the predetermined read pattern exist in the program of an application is performed along a program order, wherein the insertion performed by the hardware of the hardware implementation comprises performing read and write operations during operation of the application.

9. The computer-implemented method of claim 1, wherein static analysis is performed for determining whether the predetermined write pattern and the predetermined read pattern exist in the program of an application, wherein the static analysis includes: checking control flows to confirm that Store-Buffering (SB) and Independent Reads of Independent Writes (IRIW) patterns are not present in the program, wherein loops of the program are extracted only once during the checking of the control flows; and checking data flows to confirm volatile variables accesses and program orders associated therewith.

10. A computer-implemented method comprising:
determining whether a predetermined write pattern exists in a program of an application run on a hardware implementation;
in response to a determination that the predetermined write pattern does not exist in the program, inserting a memory fence after a variable in the program, wherein the insertion is performed by hardware of the hardware implementation; and
subsequent to the insertion of the memory fence, issue instructions to cause the hardware of the hardware implementation to execute the program,
wherein an execution time of the program subsequent to the insertion of the memory fence before the variable in the program is relatively less than an execution time of the program before the insertion of the memory fence before the variable in the program, wherein the hardware of the hardware implementation is a processor,
wherein the determining whether the predetermined write pattern and the predetermined read pattern exist in the program of the application comprises issuing instructions to cause the hardware to perform at least one thread of execution in the program.

11. The computer-implemented method of claim 10, wherein the determination of whether the predetermined write pattern exists in the program of the application is performed in response to a determination that the application runs on a computing architecture other than a Power computing architecture.

12. The computer-implemented method of claim 11, wherein the variable of the program is a volatile variable, and comprising: verifying a reduction in program execution time, wherein the verifying includes comparing the execution time of the program subsequent to the insertion of the memory fence after the variable in the program with the execution time of the program before the insertion of the memory fence after the variable in the program.

13. The computer-implemented method of claim 12, wherein the predetermined write pattern is a Store-Buffering (SB) pattern.

14. The computer-implemented method of claim 12, wherein inserting the memory fence after the variable in the program includes: inserting a release fence after a volatile write in the program.

15. The computer-implemented method of claim 12, comprising: in response to a determination that the predetermined write pattern exists in the program, inserting memory fences around variables in the program, wherein inserting memory fences around variables in the program includes: inserting a release fence before a volatile write in the program, inserting a sequentially consistent fence after the volatile write in the program, inserting an acquire fence before a volatile read in the program, and inserting an acquire fence after the volatile read in the program.

16. The computer-implemented method of claim 10, wherein static analysis is performed for determining whether the predetermined write pattern exists in the program of an application, wherein the static analysis includes: checking control flows to determine whether the predetermined write pattern exists in the program, wherein loops of the program are extracted only once during the checking of the control flows; and checking data flows to confirm volatile variables accesses and program orders associated therewith.

17. A computer program product, the computer program product comprising a computer readable storage medium having program instructions embodied therewith, the program instructions readable and/or executable by a computer to cause the computer to:
determine, by the computer, whether a predetermined write pattern and a predetermined read pattern exist in a program of an application run on a hardware implementation;
in response to a determination that the predetermined write pattern and the predetermined read pattern do not exist in the program, insert, by the computer, a memory fence before a variable in the program, wherein the insertion is performed by hardware of the hardware implementation; and
subsequent to the insertion of the memory fence, issue instructions to cause the hardware of the hardware implementation to execute the program,
wherein an execution time of the program subsequent to the insertion of the memory fence before the variable in the program is relatively less than an execution time of the program before the insertion of the memory fence before the variable in the program, wherein the hardware of the hardware implementation is a processor,
wherein the determining whether the predetermined write pattern and the predetermined read pattern exist in the program of the application comprises issuing instructions to cause the hardware to perform at least one thread of execution in the program.

18. The computer program product of claim 17, wherein the determination of whether the predetermined write pattern and the predetermined read pattern exist in the program of the application is performed in response to a determination that the application runs on a Power computing architecture.

19. The computer program product of claim 18, wherein the variable of the program is a volatile variable, and the program instructions readable and/or executable by the computer to cause the computer to: verify a reduction in program execution time, wherein the verifying includes comparing the execution time of the program subsequent to the insertion of the memory fence before the variable in the program with the execution time of the program before the insertion of the memory fence before the variable in the program.

20. The computer program product of claim 19, wherein the predetermined write pattern is a Store-Buffering (SB) pattern.

* * * * *